ELECTRICAL DISTRIBUTING PANEL

Original Filed April 25, 1950

INVENTOR.
ANDREW W. VINCENT
BY
D. Clyde Jones
ATTORNEY

1

2,782,390

ELECTRICAL DISTRIBUTING PANEL

Andrew W. Vincent, Rochester, N. Y., assignor to Talk-O Products, Inc., Rochester, N. Y., a corporation of New York Original application April 25, 1950, Serial No. 157,956. Divided and this application July 19, 1952, Serial No. 299,827

4 Claims. (Cl. 339—198)

This invention relates to an electrical terminal panel which is especially adapted for use in intercommunicating telephone systems and the like.

This application is a division of applicant's copending application 157,956, filed April 25, 1950, now Patent No. 2,646,473, issued July 21, 1953.

A main feature of the invention relates to a terminal panel which facilitates the installation of an intercommunicating telephone system or like electrical system.

The various other features and advantages of the invention will appear from the detailed description and claims when taken with the drawings in which:

Figures 1, 2, 3, 4, 5:
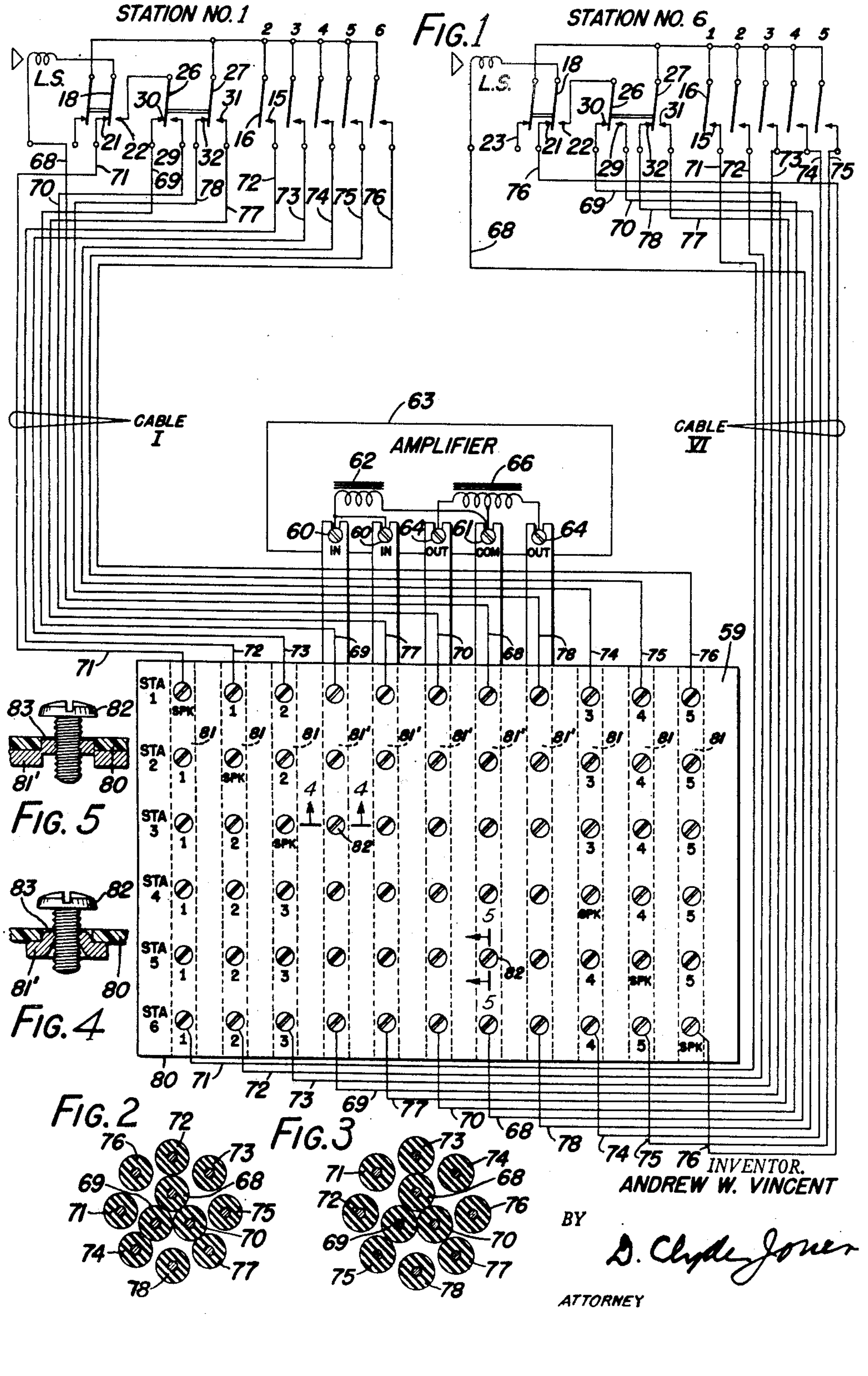
Fig. 1 illustrates the terminal panel of the present invention incorporated in an intercommunicating telephone system.
Fig. 2 is a cross-section through the cable which connects station No. 1 of the telephone system to the terminal panel.

Fig. 3 is a similar cross-section through the cable connecting station No. 6 of the telephone system with the terminal panel, particularly illustrating the arrangement of the several conductors in the respective cables; and Figs. 4 and 5 illustrate fragments of the terminal panel taken substantially on the lines 4—4 and 5—5 of Fig. 1, particularly showing the contour of each embossing of a terminal strip.

The present terminal panel can be usd in various types of intercommunicating telephone systems or the like but is especially adapted for use in the telephone system diagrammatically illustrated in Fig. 1. In this system shown, there are provided six stations (only two stations being illustrated), each of which stations has a switch unit, as disclosed in the mentioned application 157,956, and a transducer or loudspeaker LS of the permanent magnet type for talking and listening.

Each of the six stations has its switch unit connected by an eleven-conductor cable, to the present distributing panel 59 through which the conductors of the cable of each station are respectively coupled through input terminals 60, 60 and to the common terminal 61, to the input transformer 62 of an audio amplifier 63 of the vacuum tube type, and to an output terminal 64, 64 as well as to the common terminal 61 leading to the midpoint of the output transformer 66 of the amplifier.

The eleven conductor cable for station No. 6 (Fig. 3), has a central core of three twisted conductors comprising the common conductor 68, the calling input speaker conductor 69 and the calling speaker output conductor 70. Surrounding this core, there are eight conductors twisted in the reverse direction from the conductors of the core. These eight conductors comprise five station selector conductors 71, 72, 73, 74 and 75, as well as a speaker conductor 76 together with a called speaker input conductor 77 and a called speaker output conductor 78. The arrangement of the conductors in the cable for station No. 1 (Fig. 2) while similar to the arrangement of similar conductors in the cable for station No. 6, is slightly different therefrom. The other four cables for the four remaining stations, are similar to the cables already described but the necessary changed arrangement of conductors in each cable will be understood from Figs. 2 and 3. This arrangement of the conductors in each cable, enables the alternate connection of the speakers at the calling and called stations respectively to the input circuit and to the output circuit of the amplifier to provide "talk-listen" operation without disturbing the inductive balance of the system. This arrangement of the several conductors in the cable corrects any capacitive unbalance in the system by connecting the output conductor 70 in the core in "out-of-phase" relation with the output conductor 78 which is one of eight conductors twisted on the outside of the core. It will be understood that the cable of a given station has no station selector conductor for that station. It will also be understood that each piece of individual cable is cut from a long length of cable so that each of the individual cables is physically the same in construction but the wires of the several individual cables are differently connected at the panel and at the stations.

2

The distributing panel 59 of the present invention, comprises a rectangular sheet 80 of insulation suitably provided with vertical and horizontal rows of holes with six holes in a vertical row and eleven holes in a horizontal row. Each vertical row of holes has a common conducting bar such as 81 and 81′ provided with tapped holes to register with a vertical row of holes. A screw 82 passing through a hole in the panel and screwed into a registering hole in the bar 81 conductively connects one of the conductors of a cable to the bar. The bars 81 are coextensive in length with the width of the sheet 80 but the bars 81′ extend beyond the sheet 80 and have their upper ends notched to receive the respective screw terminals 60, 60, 64, 61 and 64 on the amplifier. The several legends as well as the numerals 1 to 5 marked on the panel, indicate how the several conductors of the different cables are to be connected to the various terminals on the panel. The specific construction of each bar will be understood from Figs. 1, 4 and 5. From these figures it will be seen that the bar is cut to the desired length from strip metal. The bar is then embossed at each point thereon where there is to be a hole and the hole is then tapped to receive a terminal screw. This embossing is effected by a die provided with a round hole therein and by a cooperating punch having alternate regions of small and larger die clearances, the small die clearance resulting in a shearing action as shown in Fig. 5 and the large die clearance resulting in a stretching of metal without shearing action as shown in Fig. 4. The alternate shearing and stretching of portions of each embossing can follow various selected arrangements but as herein illustrated, two opposite quarters of the embossing are stretched and the remaining quarters are sheared either partially or completely through the bar. The depth of the embossing is such that it fails to project through the panel by an amount corresponding to about one third of the diameter of the wire to be connected to the panel. Thus when a conductor is to be connected to a bar, the conductor is firmly gripped between the embossing and the terminal screw, screwed therein.

In the operation of the system as more fully disclosed in the patent application, let it be assumed that the party at station No. 6 desires to call station No. 1. The key lever for station No. 1 is depressed to its first stage thereby closing spring contacts 15, 16. At the same time the swinger 18 at the calling station No. 6 is disconnected from the back contact 21 and is connected to the front contact 22. The operations just described are effective to connect the loudspeaker LS at station No. 6 to the input of the amplifier by a circuit which may be traced from one terminal of the winding of the loudspeaker, swinger spring 18 and front contact 22, swinger 26 and back contact 30 of the talk-listen switch in its first position, conductor 69, terminal bar 81', input terminal 60 of the amplifier, primary winding of the transformer 62 in the input of this amplifier, common terminal 61 of the amplifier, through the common terminal strip, conductor 68, to the terminal of the loudspeaker winding. The loudspeaker of the wanted station No. 1 is connected to the output of the amplifier in a circuit extending from one terminal of the loudspeaker windings, swinger 18 and back contact 21, conductor 71, through a terminal strip at the terminal panel, conductor 71 leading to station No. 6, front contact 15 and swinger contact 16 of the depressed No. 1 key at station No. 6, swinger contact 27 and back contact of the talk-listen contacts at station No. 6, conductor 78, output terminal 64 of the amplifier, through the right-hand portion of the secondary winding of the output transformer 66 of the amplifier and common terminal 61, through the common terminal strip, conductor 68 to the other terminal of the loudspeaker winding at station No. 1.

The calling party at station No. 6 calls the name of the wanted party, through the loudspeaker LS and through the circuits of the amplifier as just described to the loudspeaker LS at the wanted station No. 1. The called party at station No. 1 can listen to the party at station No. 6. If the party at station No. 6 wants a reply from the party at station No. 1, the talk-listen key at station No. 6 is depressed to its second position. By this operation the loudspeaker at station No. 6 is connected to the output of the amplifier and the loudspeaker at station No. 1 is connected to the input of the amplifier. The circuit for this connection may be traced from the terminal of the loudspeaker winding, swinger contact spring 18, front contact 22, swinger 26 and front contact 29 of the talk-listen key, conductor 70, output terminal of the panel board, terminal 64 of the amplifier, through the left-hand portion of the secondary winding of the output transformer 66, conductor 68, to the other terminal of the mentioned loudspeaker winding. The circuit for connecting the winding of the loudspeaker at station No. 1 extends from the terminal of this speaker, conductor 71, through the No. 1 terminal strip at the terminal panel, conductor 71, front contact 15 and swinger contact 16 of the depressed key at station No. 6, swinger contact 27 and front contact 31, conductor 77, through the terminal strip at the panel board, input terminal 60 of the amplifier, through the input transformer 62 of the amplifier to the common terminal 61 of the amplifier thence through conductor 68 to terminal of loudspeaker. When the calling party at station No. 6 desires to resume conversation, the talk-listen switch is released to its first position so that station No. 6 is connected to the input of the amplifier and station No. 1 is connected to the output of the amplifier. The manipulation of the talk-listen switch contacts at station No. 6 enables the two parties to inter-exchange conversation.

It has been mentioned that the swinger 27 and the swinger 26 operate in a predetermined sequence with respect to their related contacts. This enables the talk-listen switch at a given station to reverse the connections of the calling and called loudspeakers with respect to the input and output of the amplifier without causing objectionable noises in these loudspeakers. For example, when the talk-listen switch at the calling station No. 6 is moved to its listen position the swinger 27 at that station first disconnects the loudspeaker at the called station from the output of the amplifier and connects it to the input thereof. Momentarily, the swinger 26 at the calling station leaves the loudspeaker of the calling station also connected to the input of the amplifier and lastly the loudspeaker of the calling station No. 6 is connected to the output of the amplifier. Thus, at no time during the talk-listen switching, is there any interruption of the input circuit to the amplifier which would cause a severe switching transient.

While the terminal panel of the present invention is especially suited for use in intercommunicating telephone systems its use is not so limited since it can be widely used in the electrical field.

What I claim is:

1. A terminal panel comprising a sheet of insulating material having a row of holes therein, a conducting strip contacting one surface of said sheet and provided with spaced integral tapped embossings to register with certain of said holes, said embossings bulging into said holes to approximately the other surface of said sheet, and a terminal screw threaded into each tapped embossing, said terminal screw having a conductor-retaining head lying near said other surface of said sheet in position to engage a conductor wire and hold said conductor wire in contact with one of said bulging embossings of said conducting strip.

2. A terminal panel comprising a sheet of insulating material having at least two parallel rows of holes therein, a conducting strip for each row contacting one surface of said sheet and provided with integral tapped embossings to register with certain of the holes of its row, and a terminal screw threaded into each tapped embossing to retain a conductor against the face of the projecting portion of the embossing at said other surface of said sheet, each of said strips having a notched end for clamping connection to the screw terminals of electrical apparatus.

3. A terminal panel comprising a sheet of insulating material of a given thickness and having a row of holes therein, a conducting strip adapted to be attached against one surface of said sheet and provided with integral tapped embossings to register with certain of said holes, each embossing bulging into its related opening a distance approximately equal thickness of said sheet and being connected to the remainder of the strip through stretched portions separated by portions at least partially sheared through the material of the strip, and a terminal screw threaded into each tapped embossing.

4. A terminal panel comprising a sheet of insulating material having a row of holes therein, a conducting strip on said sheet provided with integral circular tapped embossings to register with certain of said holes, each embossing substantially filling its related hole and being connected to the remainder of the strip through drawn arc-like portions separated by portions at least partially sheared through the material of the strip, and a terminal screw threaded into each tapped embossing.

References Cited in the file of this patent

UNITED STATES PATENTS

| | | |
|---|---|---|
| 2,249,456 | Campbell | July 15, 1941 |
| 2,326,616 | Campbell | Aug. 10, 1943 |
| 2,384,287 | Drury | Sept. 4, 1945 |
| 2,552,028 | Blair | May 8, 1951 |
| 2,565,611 | Kovach | Aug. 28, 1951 |
| 2,594,069 | Poehlmann | Apr. 22, 1952 |
| 2,613,287 | Geiger | Oct. 7, 1952 |